United States Patent [19]

Bateman

[11] Patent Number: 5,134,630
[45] Date of Patent: Jul. 28, 1992

[54] METHOD AND APPARATUS FOR TRANSPARENT TONE-IN-BAND TRANSMITTER, RECEIVER AND SYSTEM PROCESSING

[75] Inventor: Andrew Bateman, Bath, England

[73] Assignee: National Research Development Corporation, London, England

[21] Appl. No.: 505,494

[22] Filed: Apr. 6, 1990

[30] Foreign Application Priority Data

Apr. 12, 1989 [GB] United Kingdom ............... 8903236

[51] Int. Cl.$^5$ .................. H04B 15/00; H04B 1/68; H04K 1/00
[52] U.S. Cl. ......................... 375/1; 375/43; 375/61; 375/77; 455/46
[58] Field of Search .............. 375/1, 43, 61, 71, 77; 380/34; 370/111; 455/46–48, 71, 118

[56] References Cited

U.S. PATENT DOCUMENTS

| | | | |
|---|---|---|---|
| 3,699,447 | 10/1972 | Frost | 375/43 X |
| 4,679,243 | 7/1987 | McGeehan et al. | 455/47 |
| 4,691,375 | 9/1987 | McGeehan et al. | 455/71 |
| 4,726,069 | 2/1988 | Stevenson | 455/46 |
| 4,792,985 | 12/1988 | McGeehan et al. | 455/48 |
| 4,802,191 | 1/1989 | McGeehan et al. | 375/43 |

FOREIGN PATENT DOCUMENTS

| | | |
|---|---|---|
| 2163326B | 12/1987 | United Kingdom . |
| 2161661B | 1/1988 | United Kingdom . |
| 2168223B | 6/1988 | United Kingdom . |
| 2176349B | 11/1989 | United Kingdom . |
| 2180112B | 1/1990 | United Kingdom . |

OTHER PUBLICATIONS

"Digital Signal Processing Design", Andrew Bateman, PhD and Warren Yates, PhD, Pitman Publishing, 1988 pp. 52–55 and pp. 301–307, pp. 325–331.

Primary Examiner—Bernarr E. Gregory
Attorney, Agent, or Firm—Cushman, Darby & Cushman

[57] ABSTRACT

In deriving a control signal for recombining the parts of the spectrum separated by a frequency notch in transparent tone-in-band signals, cross-correlation products give rise to undesirable frequency and phase jitter. In a receiver which overcomes this problem an input signal E containing the notch is passed to two first mixers and then portions corresponding to the lower and upper portions of the input spectrum are selected by two mirror filters before being translated in frequency by two second mixers to a final output band in which the notch is eliminated. Two selection filters select parts of the spectra at the outputs of the first mixers which correspond to an overlap region of the said lower and upper portions when derived in a transmitter and apply them to a control-signal mixer. A control signal for the second mixers is derived from the output of the control-signal mixer by noise filtering and frequency division by two. The above mentioned problem is overcome by giving the mirror filters transfer functions $H_{1-}(f)$ and $H_{1+}(f)$ which are the same as the transfer functions of mirror filters in the transmitter which produced the notch and by giving the selection filters transfer functions $H_{2-}(f)$ and $H_{2+}(f)$ which satisfy the relationships $H_{2-}(f) = |H_{1-}(f)|^2$ and $H_{2+}(f) = |H_{1+}(f)|^2$.

16 Claims, 5 Drawing Sheets

METHOD AND APPARATUS FOR TRANSPARENT TONE-IN-BAND TRANSMITTER, RECEIVER AND SYSTEM PROCESSING

The present invention relates to methods and apparatus for processing transparent tone-in-band (TTIB) signals in transmitters and receivers.

TTIB systems are described in U.K. Patents Nos. 2163326B, 2161661B and 2168223B and U.K. Applications Nos. 8618423 and 8704525 which correspond respectively to U.S. Pat. Nos. 4,679,243; 4,691,375; 4,792,985; 4,947,453 and 4,802,191 and these U.S. specifications are hereby incorporated into this specification.

A problem which may arise in some previously described TTIB systems relates to a control signal which is derived to ensure that when the original baseband spectrum is restored, that is the frequency notch is removed, the frequency and phase relationships in the restored signal are substantially as they were in the original signal from which the signal containing the notch was derived. The control signal is sometimes obtained by correlating those parts of the signal containing the notch which are in the region at the upper and lower borders of the notch and are derived from the same frequency components in the original spectrum. Although there is a strong correlation at an error frequency related to differences in frequency and phase between the portions above and below the notch, there are also significant cross-correlation products which give rise to undesirable frequency and phase jitter in the control signal. This jitter can be minimized by selective filtering of the error frequency component but at the expense of system response time due to delay of the filter used. Filtering is a practical solution for many applications of TTIB but it is not completely satifactory in those applications such as packet data transmission where rapid restoration of the original spectrum is required.

According to a first aspect of the present invention there is provided a receiver processor for processing a received signal derived by a process comprising dividing the spectrum of an original signal at a predetermined frequency and inserting a notch separating upper and lower portions of the received signal, the spectrum of the received signal containing frequency components corresponding to all significant frequency components in the original signal, and first and second border regions of the upper and lower portions, respectively, each containing an overlap frequency component derived from the same frequency component in an overlap frequency band of the original signal which includes the predetermined frequency, when the overlap band contains such a component, the receiver processor comprising means for
selecting first and second signals from the first and second border regions at a point in processing where the border regions are defined by first and second "roll off" characteristics ($H_{TR+}(f)$ and $H_{TR-}(f)$) for the upper and lower portions, respectively,
the selection of the first and second signals being made using third and fourth "roll off" characteristics $H_{S-}(f)$ and $H_{S+}(f)$ for the border regions of the upper and lower portions, respectively,
the first and third, and second and fourth, roll off characteristics providing respective composite roll off characteristics ($H_{TR+}(f).H_{S-}(f)$ and $H_{TR-}(f).H_{S+}(f)$) which are each respectively symmetrical about that frequency of the upper and lower portions which was derived from the said predetermined frequency,
deriving a control signal from the first and second signals representative of any difference in frequency and phase of the said overlap component, when present, of the upper and lower portions, and
deriving, using the said control signal, an output signal containing frequency components corresponding to all significant frequency components in the upper and lower portions but having a spectrum in which the notch is removed and the frequency and phase relationships between frequency components of the original signal are substantially restored.

According to a second aspect of the invention there is provided a method of processing a received signal derived by a process comprising dividing the spectrum of an original signal at a predetermined frequency and inserting a notch separating upper and lower portions of the received signal, the spectrum of the received signal containing frequency components corresponding to all significant frequency components in the original signal, and first and second respective border regions of the upper and lower portions, respectively, each containing an overlap frequency component derived from the same frequency component in an overlap frequency band of the original signal which includes the predetermined frequency, when the overlap band contains such a component, the method comprising the steps of
selecting first and second signals from the first and second border regions at a point in processing where the border regions are defined by first and second "roll off" characteristics ($H_{TR+}(f)$ and $H_{TR-}(f)$) for the upper and lower portions, respectively,
the selection of the first and second signals being made using third and fourth "roll off" characteristics $H_{S-}(f)$ and $H_{S+}(f)$ for the border regions of upper and lower portions, respectively,
the first and third, and second and fourth, roll off characteristics providing respective composite roll off characteristics ($H_{TR+}(f).H_{S-}(f)$ and $H_{TR-}(f).H_{S+}(f)$) which are each respectively symmetrical about that frequency of the upper and lower portions which was derived from the said predetermined frequency,
deriving a control signal from the first and second signals representative of any difference in frequency and phase of the said overlap component, when present, of the upper and lower portions. and
deriving, using the said control signal, an output signal containing frequency components corresponding to all significant frequency components in the upper and lower portions but having a spectrum in which the notch is removed and the frequency and phase relationships between frequency components of the original signal are substantially restored.

An important advantage of the invention is that the cross-correlation products, whilst not eliminated, can be made to exhibit substantially perfect symmetry about a desired error frequency component, so that substantially all frequency and phase jitter of the error component cancels out. The control signal is the frequency of the error component and although filtering is usually still required a comparatively broadband low pass filter can be used so that filter time delays are not significant.

The invention may advantageously be considered in relation to a communication system comprising a receiver processor according to the first aspect of the invention and a transmitter processor for generating a transmit signal from which the receive signal is derived, the transmit signal having a frequency spectrum with upper and lower portions separated by a notch and being derived from a baseband signal.

In a receiver processor or method according to the first and second aspects of the invention, the first and second border regions of the upper and lower portions may be adjacent to the notch.

The transmitter processor may include means for frequency translation and transmit filtering of the baseband signal to generate the transmit signal, when the first and second "roll off" characteristics depend on the transmit filtering and the receiver filtering processes.

The transmit filtering may employ mirror filters with responses $H_{1+}(f)$ and $H_{1-}(f)$ in deriving the upper and lower portions respectively. The first receiver filtering processes may then advantageously employ mirror filters also with responses $H_{1+}(f)$ and $H_{1-}(f)$ for the upper and lower portions respectively when the selection of the first and second signals may be made using mirror filters with responses $H_{2-}(f)$ and $H_{2+}(f)$ for the selection of the upper and lower portions respectively. With these responses it is preferable that the following conditions are satisfied:

$$|H_{1+}(f)|^2 = H_{2+}(f)$$

and $$|H_{1-}(f)|^2 = H_{2-}(f)$$

According to a third aspect of the present invention there is provided a receiver processor for processing a received signal having a notch in the frequency spectrum thereof, separating upper and lower portions of the receive signal, the said spectrum containing frequency components corresponding to all significant frequency components in an original signal, and the receiver process comprising means for deriving a control signal representative of any change in the frequency and phase relationship between the frequency components in the upper and lower portions but as if restored to the frequency range of the original signal, the control signal containing a frequency component with a predetermined frequency related to any such change which is larger than any other frequency components in the control signal, and deriving, using the said control signal, an output signal containing frequency components corresponding to all significant frequency components in the upper and lower portions but having a spectrum in which the notch is removed and the frequency and phase relationships between frequency components of the original signal are substantially restored.

Certain embodiments of the invention will now be described, by way of example, with reference to the accompanying drawings, in which.

Figure 2:
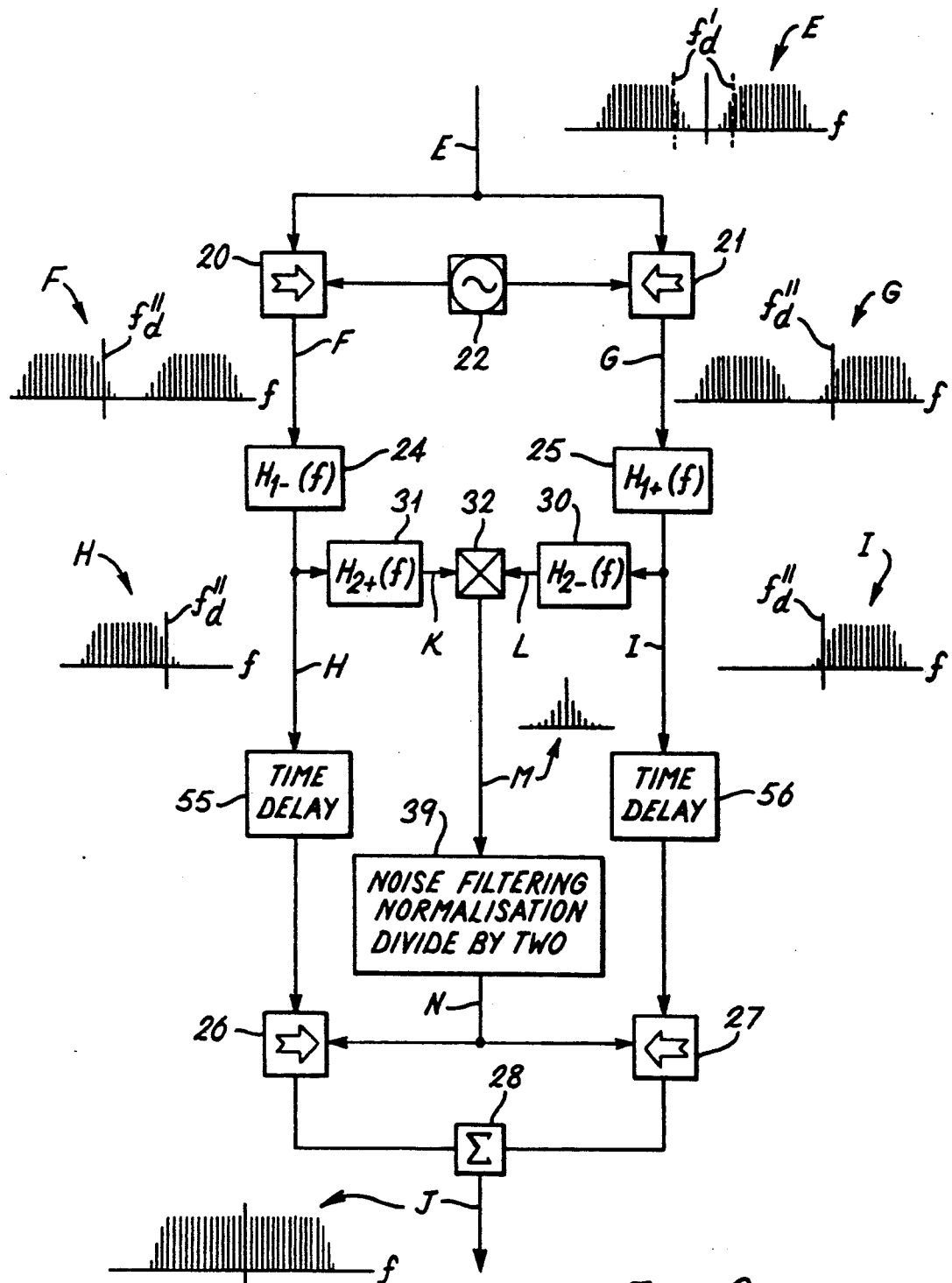
FIG. 2 is a block diagram of a TTIB receive process and apparatus.
Figure 3A:
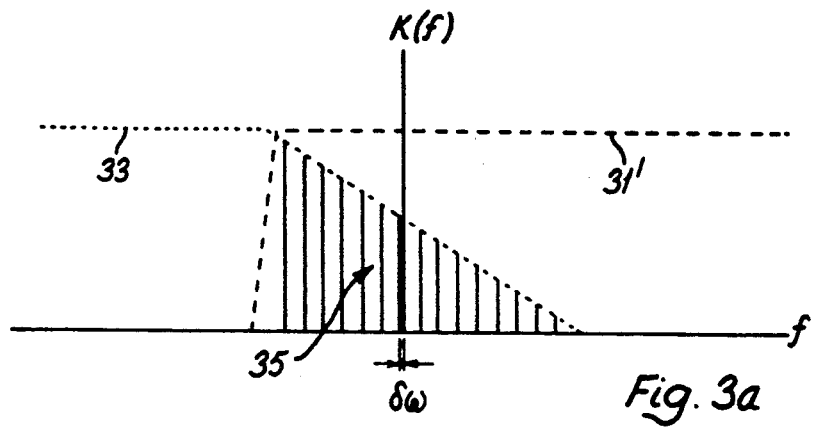
Figure 3B:
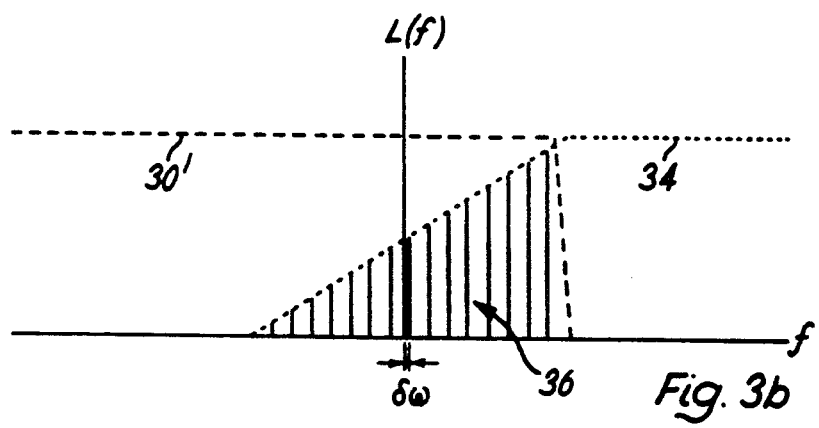
Figure 3C:
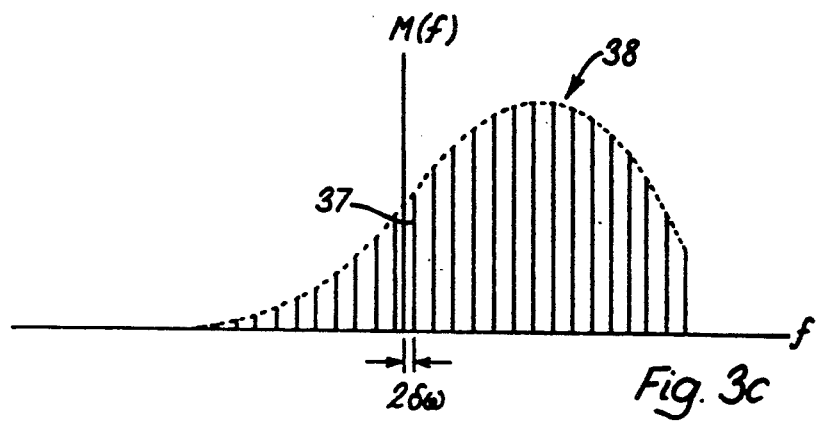
Figure 4A:
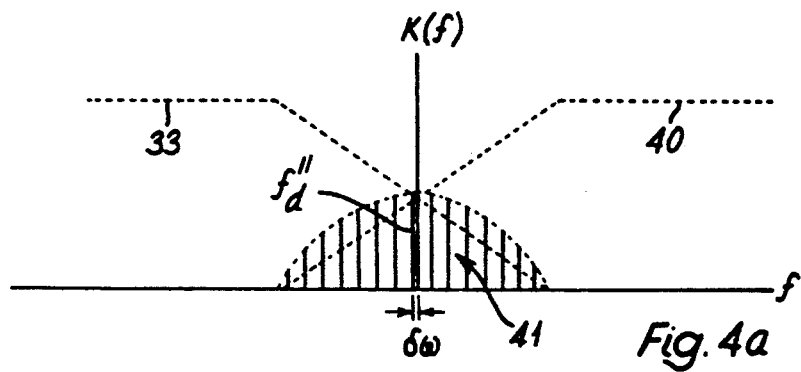
Figure 4B:
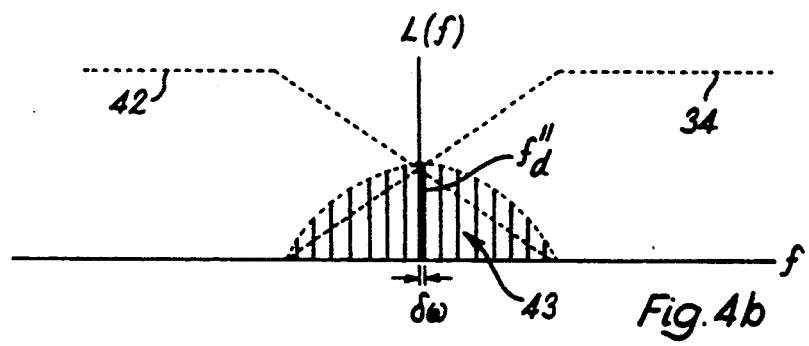
Figure 4C:
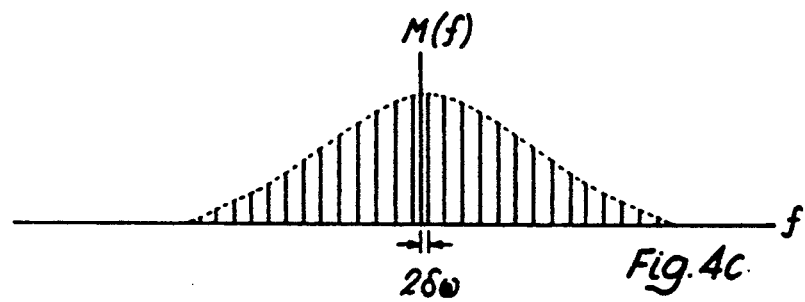
Figure 4D:
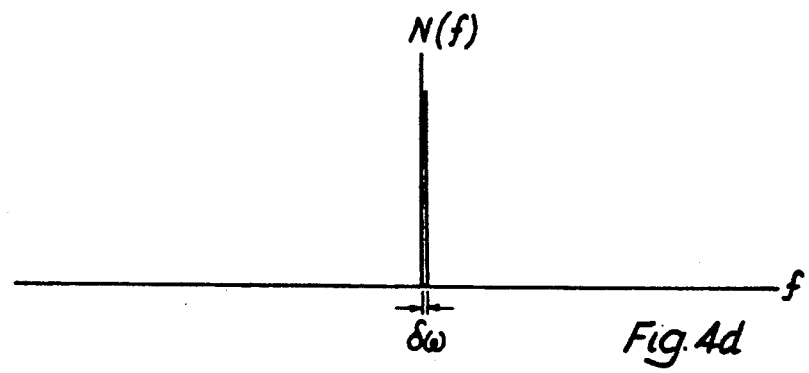
Figure 5A:
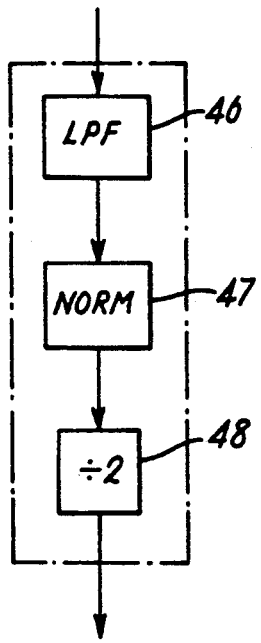
Figure 5B:
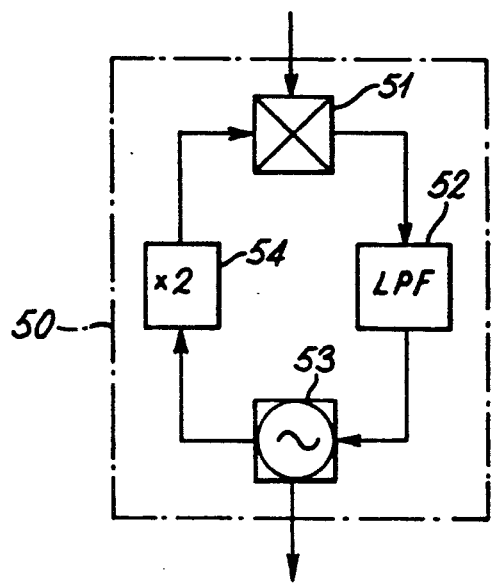

FIGS. 3(a) to 3(c) are diagrams illustrating the convolution of frequency components carried out in generating a prior art correction signal for the process of FIG. 2, FIGS. 4(a) to 4(d) are diagrams illustrating a convolution process for use with an embodiment of the present invention in deriving a control signal for the process of FIG. 2, and FIGS. 5(a) and 5(b) are block diagrams of processes for filtering, normalizing and dividing the output of a convolution process derived according to the process illustrated in FIGS. 4(a) to 4(c).

Figure 1:
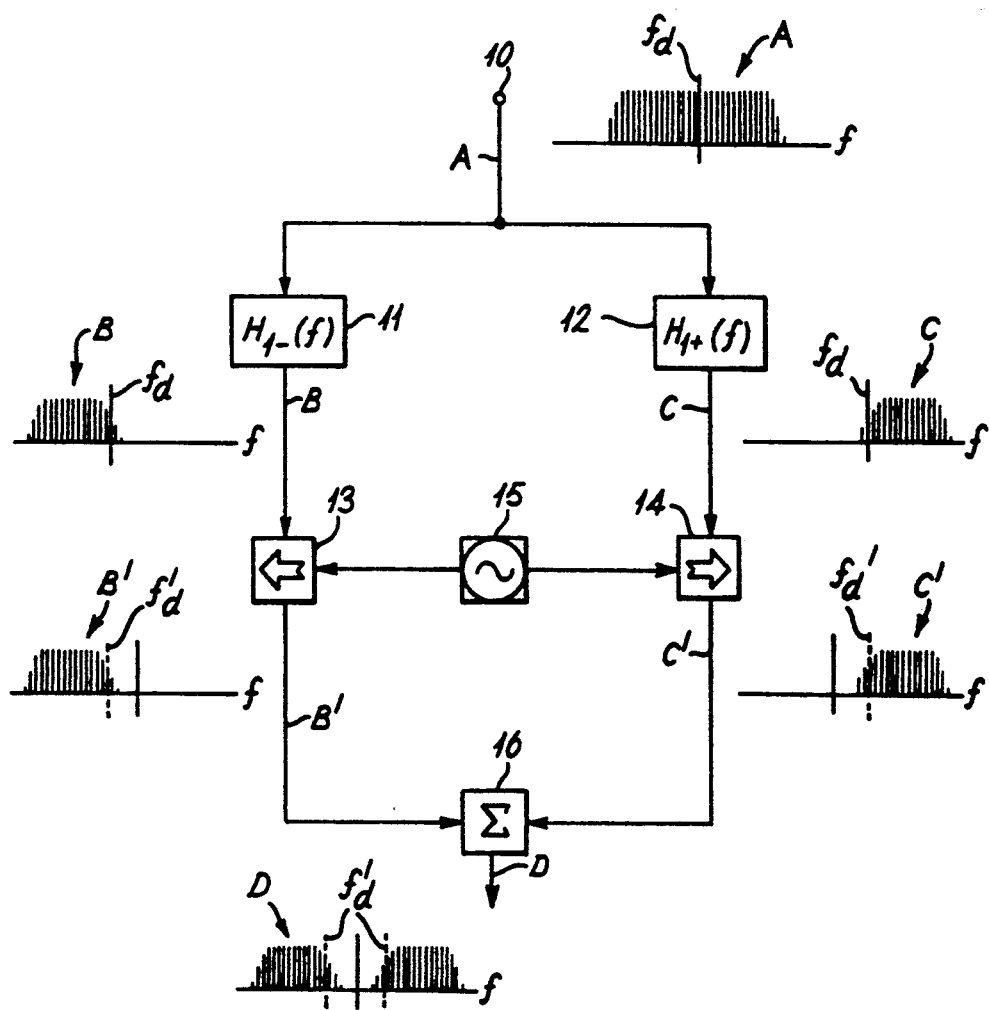
FIG. 1 is a block diagram of a TTIB transmit process and apparatus.

In FIG. 1 a baseband signal A is applied to an input terminal of a processing arrangement for use in a transmitter to generate a TTIB signal. In FIGS. 1 and 2 waveforms whose spectra are illustrated, appear in the circuit at the point where their designation letter is marked. Waveform A in FIG. 1 and the other waveforms in FIGS. 1 and 2 are considered in the complex baseband form, that is they are shown extending, in some cases, into the negative frequency region. See the book "Digital Signal Processing Design" by Andrew Bateman and Warren Yates, published by Pitman, London in 1988, which is also incorporated into this specification. Pages 52 to 55, 301 to 307 and 325 to 331 are of particular interest.

Waveform A is applied to a pair of complex quadrature mirror filters 11 and 12 in which the filter 11 provides in effect lowpass filtering and the filter 12 provides high pass filtering.

The mirror filters 11 and 12 have transfer characteristics $H_{1-}(f)$ and $H_{1+}(f)$, respectively, defined such that $$|H_{1-}(f)|^2 + |H_{1+}(f)|^2 = 1 \qquad (1)$$

and, $$h_{1+}(n) = (-1)^n h_{1-}(n) \qquad (2)$$

where h(n) represents the discrete (sampled) impulse response of H(f). The condition defined by equation (2) makes the two filters symmetrical (i.e. mirrored), with $H_{1+}(f)$ a highpass replica of $H_{1-}(f)$. There is however a region at the high end of the pass band of the low pass filter 11 and the low end of the pass band of the filter 12 where the roll-off of both the filters 11 and 12 allows frequency components at significant levels to pass in the same "overlap" band high pass.

Since the input signal is considered in complex baseband form, then $H_{1-}(f) = H_{1+}(f)$.

The outputs B and C of the filters 11 and 12 are thus $$B(f) = Y(f) \cdot H_{1-}(f) \qquad (3)$$

$$C(f) = Y(f) \cdot H_{1+}(f) \qquad (4)$$

The signal A has now been divided about a frequency $f_d$ and in order to insert the spectral notch which is characteristic of TTIB, the two signals B and C are multipled in multipliers 13 and 14 by quadrature signals from an oscillator 15. The oscillator output signals are represented by $e^{-j\omega t}$ and $e^{j\omega t}$ to give signals B' and C' which are summed at 16 to give an output signal D given by $$D(f) = Y(f)[H_{1-}(f)e^{-j\omega t} + H_{1+}(f) \cdot e^{j\omega t}] \qquad (5)$$

The spectral gap or "notch width" is equal to $2\omega$. The position of the notch within the information band Y(f) is determined by the position of Y(f) with respect to the sub-band filters $H_{1-}(f)$ and $H_{1+}(f)$. Two frequency components $f_d'$ are shown in the signals B' and C' and also in the signal D, these components having been derived from the frequency $f_d$.

While FIG. 1 has been described in terms of filters, multipliers and oscillators it is in practice usually put into operation, as is FIG. 2, by digital signal processing (DSP) performed in an integrated circuit processor. Thus the filters, multipliers and oscillator can be regarded as filtering, multiplying and oscillation processes. DSP techniques and filtering, multiplying and oscillation processes are described in the above mentioned book. Suitable processors are given on page 40 and include the TMS 32010 and the TMS 32020. The signal D may in practice be translated into the real baseband and used in ways which are mentioned in the previously mentioned Patents and Applications. In particular a pilot signal is inserted into the notch, conveniently at the summation 16, and used as the pilot signal for a single sideband (SSB) transmitter and receiver system, the pilot signal then being used in the receiver for SSB detection. In an SSB system the baseband is, of course, processed as the input signal to the SSB transmitter circuits. On reception the SSB signal is detected and translated in frequency to baseband using conventional techniques but the pilot signal can be extracted from the notch as convenient, usually immediately before the TTIB receive processing shown in FIG. 2. The signal is then fed back and used in the SSB processes of the receiver.

The original baseband spectrum is recovered using the arrangement of FIG. 2. The input spectrum E can be written as $$E(f) = D(f) + N(f) \tag{6}$$

where N(f) represents the additive white Gaussian noise contributed by the channel between the processes of FIGS. 1 and 2. In practice, the received TTIB signal may also be subject to a common frequency, phase or gain error introduced by the communication channel which is part of the above mentioned channel, such as is caused by multipath fading in a mobile radio system. However it can be shown that these errors do not significantly affect the performance of the TTIB recombination circuitry, and, by implication, the transparency of the TTIB channel.

The purpose of the TTIB receive processing is to remove the notch and restore the two frequency translated sub-bands to their original spectral position. Any frequency or phase error between the transmit and receive translation processes results in mutual interference where the transition regions of the two sub-band filters overlap, in addition to the misalignment of the two sub-bands themselves. Thus, for transparency of the TTIB process, any frequency error must be eliminated and the phase error minimized.

In FIG. 2, coarse complementary frequency translation processes 20 and 21 are first performed on the received signal, by multiplication with the complex frequency operators $e^{j(\omega+\delta\omega)t}$ and $e^{-j(\omega+\delta\omega)t}$ from an oscillator 22, where $\delta\omega$ represents an arbitrary frequency error between the transmit and receive translation operators. In practice, this frequency error is usually extremely small (<0.05 Hz), as both translation operators are normally derived from a high stability DSP processor clock. The two translated signals F and G are:

$$F(f) = Y(f).H_{1-}(f).e^{+j\delta\omega t} + N(f).e^{+j(\omega+\delta\omega)t} \tag{7}$$

and, $$G(f) = Y(f).H_{1+}(f).e^{-j\delta\omega t} + N(f).e^{-j(\omega+\delta\omega)t} \tag{8}$$

Next the translated signals are filtered using a pair of mirror filters 24 and 25 which are the same as the filters 11 and 12 of FIG. 1.

The filtered partially restored sub-bands are thus given by:

$$H(f) = Y(f).|H_{1-}(f)|^2.e^{+j\delta\omega t} + N(f).H_{1-}(f).e^{+j(\omega+\delta\omega)t} \tag{9}$$

and, $$I(f) = Y(f).|H_{1+}(f)|^2.e^{-j\delta\omega t} + N(f).H_{1+}(f).e^{-j(\omega+\delta\omega)t} \tag{10}$$

The two filtered signals form the inputs to the sub-band transition correlation process, which generate a frequency/phase estimate $\delta\omega$ for correction of the residual TTIB translation error. The components $f_d'$ are in general separated by from their correct positions and are marked as $f_d''$ in the signals F and G. Due to the noise which accompanies the received signal, the phase estimate will be degraded by phase jitter $\phi(t)$. The final frequency translation operator is thus, $e^{\pm j[\delta\omega t + \phi(t)]}$. After frequency correction by frequency multiplications 26 and 27 using $e^{-j\omega}$ and $e^{j\omega}$, respectively, a summation 2B of the two relocated sub-bands gives the desired receive TTIB output J:

$$\begin{aligned} J(f) = & Y(f) \cdot [|H_1 - (f)|^2 + |H_1 + (f)|^2] + Y(f) \cdot \\ & [|H_1 - (f)|^2 \cdot e^{-j\phi(t)} - |H_1 + (f)|^2 \cdot e^{+j\phi(t)}] + N'(f) \end{aligned} \tag{11}$$

where the noise term N'(f) is given by $$N'(f) = N(f).H_{1-}(f).e^{+j[\phi(t)+\omega t]} + N(f).H_{1+}(f).e^{-j[\phi(t)+\omega t]} \tag{12}$$

By virtue of the filters $H_{1+}(f)$ and $H_{1-}(f)$ being power complementary, and since the two filtered noise terms in the above equation are uncorrelated, the spectral density of the output noise component is identical to that of the input noise signal N(f).

It can be shown that if the noise bandwidth of the sub-band correlation process is made arbitrarily small, then the phase jitter term $\phi(t)$ in the final translation operator can be ignored. For this case, the TTIB output signal becomes, $$\begin{aligned} J(f) & = Y(f) \cdot [|H_1 - (f)|^2 + |H_1 + (f)|^2] + N'(f) \\ & = Y(f) + N'(f) \end{aligned} \tag{13}$$

which is the desired message waveform Y(f) plus the channel induced noise. The combined transmit/receive TTIB process is thus truly transparent to the message signal, provided that a portion of the energy of Y(f) occasionally falls within the transition region of the sub-band filters $H_{1+}(f)$ and $H_{1-}(f)$ to allow periodic updating of the error frequency/phase estimate $\delta\omega$. For almost all message signals encountered in practice, ranging from analog speech through to digitally modulated waveforms such as MSK and M-ary QAM, this condition is easily satisfied.

Any signal components falling within the transition region of filter $H_{1+}(f)$ will correlate with components falling within the transition region of filter $H_{1-}(f)$ since both sets of components are derived from a common portion (the overlap band) of spectrum source within the message signal $Y(f)$. It is this correlation property between the two sub-bands which provides the phase error estimate for correct sub-band recombination. In the unlikely case that no components of $Y(f)$ fall within the filter transition region, then a deterministic component can be added for correlation purposes, which is later removed in the receive processing. Addition of a separate component requires power and also reduces the transparency of the system making t an undesirable option. Fortunately, for most message signals $Y(f)$, and certainly FFSK, BPSK, QPSK and 16-QAM, sufficient energy is present within the transition region to allow substantially perfect recombination without recourse to the addition of a separate correlation term.

Filters 30 and 31 with responses $H_{2-}(f)$ and $H_{2+}(f)$ select the common spectral components of the two sub-bands falling within the sub-band overlap region. Ignoring channel noise, the outputs K and L of these filters are given by:

$$K(f) = Y(f) \cdot |H_{1-}(f)|^2 \cdot H_{2+}(f) \cdot e^{+j\delta\omega t} \quad (14)$$

and $$L(f) = Y(f) \cdot |H_{1+}(f)|^2 \cdot H_{2-}(f) \cdot e^{-j\delta\omega t} \quad (15)$$

The signals K and L contain the components $f_d''$.

To obtain a frequency/phase error estimate, these two signals are multiplied together, and the difference term retained in an operaton 32. Since multiplication in the time domain implies convolution in the frequency domain, the frequency domain response can be derived graphically as in FIGS. 3(a) to 3(c).

The deviation of the frequency at the center of the notch from its correct position is shown by the frequency difference $d\omega$ in FIGS. 3(a) and 3(b).

The characteristics 30' and 31' of the filters 30 and 31, respectively, are as shown in FIGS. 3(a) and 3(b) and are defined as "brick wall" filters. The effect of the filters 11 and 24 is shown as the characteristic 33 and the spectrum passed is indicated at 35 by spectral lines where the characteristics 31' and 33 overlap. Similarly in FIG. 3(b) the region 36 indicates the spectral region passed by the characteristics 30' and 34. Thus the areas 35 and 36 represent the spectrum of the signals K and L, if the power spectral density $Y(f)$ of the message signal is assumed flat across the transition band and, for simplicity, the gain response of the composite filters 11 and 24, and 12 and 25 is made to exhibit a linear roll-off within the transition band.

Filter characteristics of this type give rise to the problem illustrated by FIG. 3(c) where convolution of the regions 35 and 36 is illustrated. FIG. 3(c) shows that whilst there is a strong correlation component 37 at twice the error frequency $\delta\omega$, there are also significant cross-correlation products in the region 3B which give rise to undesirable frequency and phase jitter of the wanted error term. This jitter can be minimized by selective filtering of the error frequency component, but at the expense of system response time due to time delay of the filter. Whilst such selective filtering is a practical solution for many applications of TTIB, it is far from satisfactory in those applications such as packet data transmission, where rapid sub-band recombination is required.

According to one embodiment of the present invention, by suitable choice of filter response for the filters 30 and 31, the cross-correlation products, whilst not eliminated, can be made to exhibit substantially perfect symmetry about the desired error frequency components $f_d''$ derived ultimately from the frequency $f_d$, so that all frequency and phase jitter of the error component cancels out, as indicated by FIGS. 4(a) to 4(d). The resultant signal can in effect be viewed as a full carrier AM waveform, which after amplitude normalization provides the desired undistorted error frequency component, $2\delta\omega$.

To achieve symmetry of the cross-correlation products, the spectra of the components within the two sub-band transition regions are made identical apart from the common frequency shift $\delta\omega$. For this to be true, the transfer functions of the filters 30 and 31 satisfy the following relationships:

$$H_{2-}(f) = |H_{1-}(f)|^2 \quad (16)$$

$$H_{2+}(f) = |H_{1+}(f)|^2 \quad (17)$$

which ensures that equations (14) and (15) are identical apart from the frequency translation error $\pm\delta\omega$.

In FIG. 4(a) the composite response of the filters 11 and 24 is again designated 33 while the response of the filter 31 as defined in equation (17) is designated 40. As a result of the equation 17, the composite roll-off of the filters 11 and 24 is symmetrical with the roll-off of the filter 31 about the vertical axis of FIG. 4(a) which corresponds to a frequency derived from the frequency $f_d$. The resultant spectral content of the overlap region is indicated by the spectral lines in the region 41. Similarly in FIG. 4(b) the composite response of the filters 12 and 25 is indicated at 34 while the response of the filter 30 as defined in equation (16) is indicated at 42. Again, the composite roll-off of the filters 12 and 25 is symmetrical with the roll-off of the filter 30 about the vertical axis of FIG. 4(b) which also corresponds to a frequency derived from the frequency $f_d$. The resulting spectral region captured by the two filters is indicated at 43. On multiplying the outputs of the filters 30 and 31 together in the operation 32 to correlate the outputs from the filters 30 and 31 the signal M is obtained whose spectral content is shown in FIG. 4(c) and which peaks at the frequency $2\delta\omega$, that is at twice the deviation of the nominal central frequency in the notch from the center of the notch.

Thus FIG. 4(c) illustrates the spectrum produced by the convolution process carried out by the operation 32. On noise filtering, normalization and frequency division by two (operation 39) the signal N is obtained (with the single spectral line shown in FIG. 4(d)) and this is the signal required for the frequency translation processes 26 and 27 to give a frequency/phase error-free resultant spectrum J after the summation 2B. When the above mentioned symmetry condition of equations (16) and (17) is satisfied, the time domain representation of the outputs of filters 30 and 31 can be written respectively as:

$$K(f) = \sum_n a_n \cdot e^{\pm j(\omega n t + \delta\omega t)} \quad (18)$$

and

-continued $$L(f) = \sum_m a_m \cdot e^{\pm j(\omega_m t - \delta \omega t)} \quad (19)$$

or, expressed as a composite signal, as:

$$K(f) = a(t) \cdot e^{\pm j[\delta \omega t + \alpha(t)]} \quad (20)$$

and $$L(f) = a(t) \cdot e^{\pm [-\delta \omega t + \alpha(t)]} \quad (21)$$

where a(t) and α(t) are the resultant time varying amplitude and phase.

The difference product of these two waveforms represents the desired correlator output, M(f), where:

$$M(f) = a^2(t) \cdot e^{\pm j2\delta \omega t} \quad (22)$$

This signal can be viewed as a full carrier AM waveform [a²(t) always greater than zero], which after normalization and frequency division yields the desired frequency correction operator:

$$N(f) = e^{\pm j\delta \omega t} \quad (23)$$

Two methods for error signal normalization and subsequent frequency/phase division for the operation 39 are shown in FIGS. 5(a) and 5(b). One involves discrete amplitude normalization followed by phase vision, the other employs a phase locked loop (PLL) arrangement.

In FIG. 5(a), after low pass filtering 46, the envelope of the error signal waveform from the operation 32 is derived using DSP techniques by squaring and addition of the two quadrature error terms, yielding the squared envelope term a²(t). A look-up table provides the conversion from a²(t) to 1/a²(t) which when multiplied with the error term (operation 47) gives the normalized output $e^{\pm j2\delta\omega t}$. A frequency division-by-two operation 48 provides the correction term $e^{\pm j\delta\omega t}$ and is implemented using a second look-up table. The necessity for frequency division introduces a 180° phase ambiguity into the final TTIB correction term, which in turn introduces a potential 180° phase reversal (or inversion) of the TTIB output signal. In most applications of TTIB, such as analogue speech transmission with in-band signalling, this phase ambiguity is irrelevant and can be ignored. For TTIB-based coherent data systems however, the ambiguity can be catered for by known techniques such as differential encoding of the data stream, or by using a known preamble data sequence or valid data words to detect phase inversion, for example.

In FIG. 5(b), an alternative way of implementing the operation 39, a PLL 50 includes a loop phase detector 51 receiving an input from the operation 32 and with output processed by a loop filter 52 to provide the control signal at δω for a voltage controlled oscillator (VCO) 53. Amplitude normalization is performed automatically within the PLL 50 since the VCO always gives a constant level output. Frequency division is accomplished by passing another input signal at 2δω to the loop phase detector 51 from a frequency multiply-by-two operation 54 between the oscillator 53 (with output at δω) and the phase detector.

Using a PLL arrangement for normalization has two distinct advantages over the first method described. Firstly, if the input to the PLL is removed, a phase/frequency correction signal is still available from the VCO, whereas it will vanish with the discrete normalization system. By clamping the VCO drive when the input disappears, (that is if there are no components falling within the sub-band transition region, or if the received signal is subject to severe multipath fading), a very accurate phase and frequency estimate can be maintained over several minutes, until a suitable correlation signal re-appears. The second advantage of using the PLL is that the phase ambiguity, whilst still present with the PLL implementation, can be more easily compensated for than with the direct method.

A fast sub-band recombination process for TTIB is crucial for applications such as packet data transmission, where the overheads of, for example, carrier synchronization, symbol synchronization and TTIB sub-band locking become important. With the direct normalization method, the time delay associated with frequency error estimation is simply the time delay associated with the filters 24 and 25 and the error frequency lowpass filter 46. The inclusion of a lowpass filter serves to minimise channel noise induced phase jitter of the error frequency estimate. During the initial sub-band recombination phase, this filter may be bypassed to reduce the recombination delay time. Once the frequency error estimate has been established, the filter 46 may be switched in, and may be a very narrow lowpass filter, since the frequency error is typically less than 0.05 Hz, so that negligible phase jitter due to channel noise is experienced.

FIR techniques may be used to implement the filters 30 and 31, then the delay introduced can be offset by identical delays 55 and 56 in the signal path (see FIG. 2) and no data need be lost during the sub-band recombination period. Only, when absolute delay in the received signal path is of significance, does the delay of filters 30 and 31 become important. A typical value of absolute delay for these filters, assuming a transition width of 100 Hz, is 3 ms.

For the PLL normalization system, the acquisition time of the loop must also be taken into account. For initial synchronization purposes, the loop bandwidth and loop gain can be made very large, so that rapid loop acquistion can be achieved, (less than 100 μs). Once synchronization, the loop gain, and hence bandwidth, can be made extremely small, (due to the precise knowledge of the sub-band separation frequency), so that the loop tracking error due to channel noise falling within the correlation bandwidth can again be minimised.

Although embodiments of the invention have been specifically described in relation to complex baseband form, it will be realised that the invention can be put into practice in many other ways including those employing the real baseband form, for example as described in U.K. Patents 2161661B and 2163326B, and U.K. Patent Application No. 8618423.

The notch and the upper and lower portions of the spectrum may be derived in ways which place the frequency $f_d'$, derived from the frequency $f_d$, in other positions in the portions; for example the frequency $f_d'$ may be in the lower border regions of both upper and lower portions, in the upper border regions of both portions, or in the upper border region of one portion and the lower border region of the other portion. The invention can be used in any of these circumstances if the appropriate filter "roll off" characteristics are provided.

I claim:

1. A method of processing a received signal derived by a process comprising dividing a spectrum of an original signal at a predetermined frequency and inserting a notch separating an upper spectrum portion and a lower spectrum portion of the received signal, a spectrum of the received signal containing frequency components corresponding to frequency components in the original signal, and first and second respective border regions of the upper and lower portion, respectively, containing an overlap frequency component derived from a single frequency component in an overlap frequency band of the original signal which includes the predetermined frequency, when the overlap band contains such a component, the method comprising the steps of:

selecting first and second signals from said first and said second border regions at a location in a circuit processing the signal where the border regions have first and second roll off characteristics for the upper and lower portions, respectively, and using third and fourth roll off characteristics for the border regions of the upper and lower portions, respectively, the first and third roll off characteristics providing a composite roll off characteristic which is symmetrical about a frequency in the upper portions which is derived from the said predetermined frequency and the second and fourth roll off characteristics providing a composite characteristic which is symmetrical about a frequency in the lower portion which is derived from the said predetermined frequency, deriving a control signal from the first and second signals representative of difference in frequency and phase of the said overlap component, when present, of the upper and lower portions, and deriving, using the said control signal, an output signal containing frequency components corresponding to frequency components in the upper and lower portions in a continuous spectrum without the notch and in which the frequency and phase relationships between frequency components of the original signal are restored.

2. A method according to claim 1 wherein the first and second border regions of the upper and lower portions are adjacent to the notch.

3. A method according to claim 1 wherein the first and second signals are correlated, to provide a resultant signal, in deriving the control signal.

4. A method according to claim 3 wherein the resultant signal after correlation is low-pass filtered and normalized and then divided in frequency to bring said resultant signal to a suitable frequency for use as the control signal in demodulating signals derived from the upper and lower portions to provide the said output signal.

5. A method according to claim 4 wherein the normalization, low-pass filtering and frequency division are carried out by means of a phase locked loop in which the resultant signal, and the control signal after frequency multiplication by two, are multiplied together and the result is low-pass filtered and applied to control the frequency of an oscillation generating the control signal.

6. A method according to claim 1 comprising the further steps of using first and second translation stages in deriving the said output signal, the first stage employing a fixed-frequency oscillation to carry out frequency translation by frequency multiplying at least one of the said portions, and the second stage employing the control signal to carry out further frequency translation to frequency multiply signals derived from the first stage, filtering the signal from the first stage by first receiver filtering processes to remove unwanted sideband signals before application to the second stage, and filtering the signals from the first receiver filtering processes by selection filter processes having the said third and fourth roll off characteristics to generate the first and second signals.

7. A receiver processor for processing a received signal derived by a process that includes dividing a spectrum of an original signal at a predetermined frequency and inserting a notch separating an upper spectrum portion and lower spectrum portions of the received signal, the spectrum of the received signal including frequency components corresponding to frequency components in the original signal, and each of first and second border regions of the upper and lower portions, respectively, including an overlap frequency component derived from a single frequency component in an overlap frequency band of the original signal which includes the predetermined frequency, when the overlap band includes such a component, the receiver processor comprising:

selection means for selecting first and second signals from said first and said second border regions at a location in the receiver processor where said border regions have first and second roll off characteristics for the upper and lower portions, respectively, the selection means, in operation, employing third and fourth roll off characteristics, respectively, to select the first and second signals, and wherein the selection means being such that the first and third roll off characteristics provide a composite roll off characteristic which is symmetrical about a frequency in the upper portion which is, in operation, derived from the said predetermined frequency, and such that the second and fourth roll off characteristics provide a composite characteristic which is symmetrical about a frequency in the lower portion which is, in operation, derived from the said predetermined frequency, means for deriving a control signal from the first and second signals representative of a difference in frequency and phase of the said overlap component, when present, of the upper and lower portions, and means for deriving, using the said control signal, an output signal containing frequency components corresponding to frequency components in the upper and lower portions in a continuous spectrum with the notch and in which the frequency and phase relationships between frequency components of the original signal are restored.

8. A receiver processor according to claim 7 wherein the first and second border regions of the upper and lower portions are adjacent to the notch.

9. A receiver processor according to claim 7 wherein the means for deriving the control signal correlates the first and second signals, to provide a resultant signal, in deriving the control signal.

10. A receiver processor according to claim 9 including means for low-pass filtering the resultant signal after correlation and for normalizing and then dividing in frequency to bring the said resultant signal to a suitable frequency for use as the control signal in demodulating signals derived from the upper and lower portions to provide the said output signal.

11. A receiver processor according to claim 10 wherein the means for low-pass filtering, normalizing and frequency dividing comprise a phase locked loop which the resultant signal, and the control signal after frequency multiplication by two, are multiplied together and the result is low-pass filtered and applied to control the frequency of an oscillator generating the control signal.

12. A receiver processor according to claim 1, wherein the means for deriving the output signal comprises two frequency translation stages, the first stage including a fixed-frequency oscillator and means for carrying out frequency translation by frequency multiplying at least one of the said portions by the output of the oscillator, and the second stage including means for carrying out further frequency translation by using the control signal to frequency multiply signals derived from the first stage, and first receiver filtering means for filtering the signal from the first stage to remove unwanted sideband signals before application to the second stage, and the means for selecting first and second signals comprises selection filter means for filtering the signals from the first receiver filtering means, the selection filter means having the said third and fourth roll off characteristics to generate the first and second signals.

13. A receiver processor according to claim 12 wherein the first receiver filtering means comprises first and second filters for removing unwanted sideband signals from the upper and lower portions, respectively, and the said selection means selects the first and second signals from the outputs of the first and second filters, respectively, whereby the first and second roll off characteristics depend partly on roll off characteristics of the first and second filters, respectively, and partly on expected roll off characteristics of the spectral content of the said border regions on reception by the receiver.

14. A communication system comprising:

a transmitter processor for generating a transmit signal from which a received signal is derived, the transmit signal being derived by dividing a spectrum of an original signal at a predetermined frequency and inserting a notch separating an upper spectrum portion and lower spectrum portions of the transmit signal, the spectrum of the transmit signal including frequency components corresponding to frequency components in the original signal, and each of first and second border regions of the upper and lower portions, respectively, including an overlap frequency component derived from a single frequency component in an overlap frequency band of the original signal which includes the predetermined frequency, when the overlap band includes such a component, and a receiver processor for processing the received signal comprising:

selection means for selecting first and second signals from said first and said second border regions at a location in said communication system where said border regions have first and second roll off characteristics for the upper and lower portions, respectively, the selection means, in operation, employing third and fourth roll off characteristics, respectively, to select the first and second signals, and wherein the selection means being such that the first and third roll off characteristics provide a composite roll off characteristic which is symmetrical about a frequency in the upper portion which is, in operation, derived from the said predetermined frequency, and such that the second and fourth roll off characteristics provide a composite characteristic which is symmetrical about a frequency in the lower portion which is, in operation, derived from the said predetermined frequency, means for deriving a control signal from the first and second signals representative of difference in frequency and phase of the said overlap component, when present, of the upper and lower portions, and means for deriving, using the said control signal, an output signal containing frequency components corresponding to frequency components in the upper and lower portions in a continuous spectrum without the notch and in which the frequency and phase relationships between frequency components of the original signal are restored.

15. A communication system according to claim 14, wherein the transmitter processor includes means for frequency translation, and transmit filtering, of an original baseband signal to generate the transmit signal, and in the receiver processor the means for deriving the output signal comprises first and second frequency translation stages, the first stage including a fixed-frequency oscillator and means for carrying out frequency translation by frequency multiplying at least one of the said portions by the output of the oscillator, and the second stage including means for carrying out further frequency translation by using the control signal to frequency multiply signals derived from the first stage, and first receiver filtering means for filtering the signal from the first stage to remove unwanted sideband signals before application to the second stage, the first and second roll off characteristics depending on the transmit filtering and the first receiver filtering means, and the means for selecting first and second signals comprises selection filter means for filtering the signals from the first receiver filtering means, the selection filter means having the said third and fourth roll off characteristics to generate the first and second signals.

16. A communication system according to claim 15 wherein the transmitter processor comprises mirror filters with transfer characteristics $H_{1+}(f)$ and $H_{1-}(f)$ for the transmit filtering in deriving the upper and lower portions, respectively, the first receiver filtering means comprises mirror filters also with transfer characteristics $H_{2-}(f)$ and $H_{2+}(f)$ for selecting the first and second signals from the upper and lower portions, respectively, and wherein the following conditions are satisfied $$|H_{1+}(f)|^2 = H_{2+}(f),$$

and $$|H_{1-}(f)|^2 = H_{2-}(f).$$

* * * * *